United States Patent
Marshall

(10) Patent No.: US 6,728,839 B1
(45) Date of Patent: Apr. 27, 2004

(54) ATTRIBUTE BASED MEMORY PRE-FETCHING TECHNIQUE

(75) Inventor: John William Marshall, Cary, NC (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 09/181,251

(22) Filed: Oct. 28, 1998

(51) Int. Cl.⁷ ............................................. G06F 12/00
(52) U.S. Cl. ...................... 711/137; 711/152; 711/163; 712/207
(58) Field of Search .......................... 711/118, 3, 130, 711/137, 152, 163; 710/1, 123; 712/207

(56) References Cited

U.S. PATENT DOCUMENTS

| | | | |
|---|---|---|---|
| 4,590,554 A | 5/1986 | Glazer et al. ............... | 364/200 |
| 4,598,400 A | 7/1986 | Hillis ........................ | 370/60 |
| 4,709,327 A | 11/1987 | Hillis et al. ................. | 364/200 |
| 4,773,038 A | 9/1988 | Hillis et al. ................. | 364/900 |
| 4,791,641 A | 12/1988 | Hillis ........................ | 371/38 |
| 4,805,091 A | 2/1989 | Thiel et al. ................. | 364/200 |
| 4,809,202 A | 2/1989 | Wolfram ..................... | 364/578 |
| 4,870,568 A | 9/1989 | Kahle et al. ................ | 364/200 |
| 4,922,486 A | 5/1990 | Lidinsky et al. ............. | 370/60 |
| 4,965,717 A | 10/1990 | Cutts, Jr. et al. ........... | 364/200 |
| 4,993,028 A | 2/1991 | Hillis ........................ | 371/39.1 |
| 5,067,078 A * | 11/1991 | Talgam et al. ................ | 711/3 |
| 5,070,446 A | 12/1991 | Salem ........................ | 395/500 |
| 5,111,198 A | 5/1992 | Kuszmaul .................. | 340/825.52 |
| 5,113,510 A | 5/1992 | Hillis ........................ | 395/425 |
| 5,117,420 A | 5/1992 | Hillis et al. ................ | 370/60 |
| 5,129,077 A | 7/1992 | Hillis ........................ | 395/500 |
| 5,148,547 A | 9/1992 | Kahle et al. ................ | 395/800 |
| 5,151,996 A | 9/1992 | Hillis ........................ | 395/800 |
| 5,157,663 A | 10/1992 | Major et al. ................ | 371/9.1 |
| 5,175,865 A | 12/1992 | Hillis ........................ | 395/800 |

(List continued on next page.)

Primary Examiner—Nasser Moazzami
(74) Attorney, Agent, or Firm—Cesari and McKenna, LLP

(57) ABSTRACT

An enhanced prefetching technique enables control of internal activities of a cache memory by a processor without relying on conventional algorithms. The cache memory is contained within a processor complex of a programmable arrayed processing engine used to efficiently process data within an intermediate network station of a computer network. The cache may further assume various functions while providing an interface to an external memory of the station via a memory controller. That is, the cache may function as a read buffer, a write buffer and/or a buffer for pending atomic commands, each of which is merged into a single memory bank that can be partitioned in any manner to enable efficient utilization.

107 Claims, 6 Drawing Sheets

U.S. PATENT DOCUMENTS

| | | | |
|---|---|---|---|
| 5,212,773 A | 5/1993 | Hillis | 359/200 |
| 5,222,216 A | 6/1993 | Parish et al. | 395/275 |
| 5,222,237 A | 6/1993 | Hillis | 395/650 |
| 5,247,613 A | 9/1993 | Bromley | 395/200 |
| 5,247,694 A | 9/1993 | Dahl | 395/800 |
| 5,255,291 A | 10/1993 | Holden et al. | 375/111 |
| 5,261,105 A | 11/1993 | Potter et al. | 395/725 |
| 5,265,207 A | 11/1993 | Zak et al. | 395/200 |
| 5,274,631 A | 12/1993 | Bhardwaj | 370/60 |
| 5,289,156 A | 2/1994 | Ganmukhi | 340/146.2 |
| 5,295,258 A | 3/1994 | Jewett et al. | 395/575 |
| 5,301,310 A | 4/1994 | Isman et al. | 395/575 |
| 5,317,726 A | 5/1994 | Horst | 395/575 |
| 5,353,428 A * | 10/1994 | Shibata | 711/145 |
| 5,355,492 A | 10/1994 | Frankel et al. | 395/700 |
| 5,357,612 A | 10/1994 | Alaiwan | 395/200 |
| 5,361,363 A | 11/1994 | Wells et al. | 395/800 |
| 5,367,692 A | 11/1994 | Edelman | 395/800 |
| 5,386,546 A * | 1/1995 | Hamaguchi | 711/133 |
| 5,388,214 A | 2/1995 | Leiserson et al. | 395/200 |
| 5,388,262 A | 2/1995 | Hillis | 395/650 |
| 5,390,298 A | 2/1995 | Kuszmaul et al. | 395/200 |
| 5,404,296 A | 4/1995 | Moorhead | 364/421 |
| 5,404,562 A | 4/1995 | Heller et al. | 395/800 |
| 5,428,761 A * | 6/1995 | Herlihy et al. | 711/130 |
| 5,440,752 A * | 8/1995 | Lentz et al. | 710/123 |
| 5,455,932 A | 10/1995 | Major et al. | 395/489 |
| 5,485,627 A | 1/1996 | Hillis | 359/800 |
| 5,499,384 A * | 3/1996 | Lentz et al. | 710/1 |
| 5,530,809 A | 6/1996 | Douglas et al. | 395/200.2 |
| 5,535,408 A | 7/1996 | Hillis | 395/800 |
| 5,561,669 A | 10/1996 | Lenney et al. | 370/60.1 |
| 5,617,538 A | 4/1997 | Heller | 395/200.02 |
| 5,621,885 A | 4/1997 | Del Vigna, Jr. | 395/182.11 |
| 5,627,965 A | 5/1997 | Liddell et al. | 395/185.01 |
| 5,673,423 A | 9/1997 | Hillis | 395/553 |
| 5,710,814 A | 1/1998 | Klemba et al. | 380/9 |
| 5,742,604 A | 4/1998 | Edsall et al. | 370/401 |
| 5,751,955 A | 5/1998 | Sonnier et al. | 395/200.19 |
| 5,764,636 A | 6/1998 | Edsall | 370/401 |
| 5,781,924 A * | 7/1998 | Zaitzeva et al. | 711/131 |
| 5,787,255 A | 7/1998 | Parlan et al. | 395/200.63 |
| 5,802,569 A * | 9/1998 | Genduso et al. | 711/137 |
| 5,838,915 A | 11/1998 | Klausmeier et al. | 395/200.45 |
| 5,909,698 A * | 6/1999 | Arimilli et al. | 711/145 |
| 5,953,512 A * | 9/1999 | Cai et al. | 711/204 |
| 6,012,106 A * | 1/2000 | Schumann et al. | 710/22 |

* cited by examiner

ATTRIBUTE BASED MEMORY PRE-FETCHING TECHNIQUE

CROSS-REFERENCE TO RELATED APPLICATIONS

This invention is related to the following copending and commonly-assigned U.S. Patent Applications:

U.S. patent application Ser. No. 09/106,478 titled, Programmable Arrayed Processing Engine Architecture for a Network Switch, filed on Jun. 29, 1998; issued as U.S. Pat. No. 6,513,108 on Jan. 28, 2003.

U.S. patent application Ser. No. 09/106,436 titled, Architecture for a Processor Complex of an Arrayed Pipelined Processing Engine, filed on Jun. 29, 1998; issued as U.S. Pat. No. 6,195,739 on Feb. 27, 2001, U.S. patent application Ser. No. 09/106,244 titled, System for Context Switching between Processing Elements in a Pipeline of Processing Elements, filed on Jun. 29, 1998; issued as U.S. Pat. No. 6,101,599 on Aug. 8, 2000, and U.S. patent application Ser. No. 09/106,246 titled, Synchronization and Control System for an Arrayed Processing Engine, filed on Jun. 29, 1998; issued as U.S. Pat. No. 6,119,215 on Sep. 12, 2000.

FIELD OF THE INVENTION

The present invention is directed to computer memory architectures and, more specifically, to a prefetching technique for reducing delays associated with accessing a cache memory of a network switch.

BACKGROUND OF THE INVENTION

Computer architecture generally defines the functional operation, including the flow of information and control, among individual hardware units of a computer. One such hardware unit is the processor or processing engine which contains arithmetic and logic processing circuits organized as a set of data paths. In some implementations, the data path circuits may be configured as a processor having internal registers for use with operations that are defined by a set of instructions. The instructions are typically stored in an instruction memory and specify a set of hardware functions that are available on the processor. When implementing these functions, the CPU generally processes "transient" data residing in a data memory in accordance with the instructions.

A high-performance processing engine configured for use in, e.g., a network switch, may be realized by using a number of identical processors to perform certain tasks in parallel. For a purely parallel multiprocessor architecture, each processor may have shared or private access to non-transient data (such as "table" data contained in forwarding and routing tables, statistics, access filters, encryption keys and/or queuing information) stored in an external memory coupled to the processor. Access to the external memory is generally inefficient because the execution capability of each processor is substantially faster than its external interface capability; as a result, the processor often idles while waiting for the accessed data. Moreover, scheduling of external accesses to a shared memory is cumbersome because the processors may be processing different portions of the data.

A cache memory may be used in these situations to improve the memory efficiency of each processor of the processing engine. The cache memory access speed is closer to the operational speed of the processor and thus, use of the cache memory increases the speed of data processing by providing information to the processor at a rapid rate. The cache memory holds a number of blocks (i.e, cache lines) of information, with each cache line containing information from one or more contiguous external memory locations. Each cache line is identified by a cache address that includes memory address bits that identify corresponding memory locations. These bits are collectively called an index. In addition to information from the memory, each cache line is also associated with a remainder of the memory address bits identifying the specific location in external memory from which the information in the cache block was obtained. These latter bits are collectively called a tag. When the processor requires information, the index is used to select a tag in the cache to determine whether a cache line contains the requested information.

When the address in the cache does not match the address in the external memory specified by the processor (i.e., a cache miss), a read request is issued to acquire a new cache line of information from the memory. The acquired cache line is provided to the processor which may update the data and then overwrite the cache line location in the cache. If the cache is a store-through cache, the updated data is immediately copied onto external memory to ensure that the memory always has a valid copy of all data. An advantage of the store-through cache is that overwrite operations can occur immediately in the cache without losing data. However, the processor generally writes data to the cache much faster than the data is forwarded onto external memory. Such a speed mismatch may result in outstanding write requests to the external memory which may, in turn, adversely impact the performance of the processor if it stalls waiting for the requests to complete.

The cache memory generally operates in accordance with the property of "locality of reference", whereby references to memory locations at any given time tend to be confined within a localized area in memory. Based on this property, attempts to control the internal activities (e.g., the aging policy) of a cache relied heavily on previous accesses to the cache and on conventional algorithms, such as a least recently used (LRU) algorithm. However, random accesses to non-transient table data used by a processor of a network switch can adversely affect the locality of references and, thus, control of the cache memory's internal activities.

Therefore, an object of the present invention is to provide a caching technique that improves the overall memory efficiency of a processing engine of an intermediate network station.

Another object of the present invention is to provide a technique that provides efficient control of a cache memory associated with a processor of a programmable arrayed processing engine.

SUMMARY OF THE INVENTION

The present invention comprises an enhanced prefetching technique that enables control of internal activities of a cache memory by a processor without relying on conventional algorithms. The cache memory is preferably a level zero (L0) cache contained within a processor complex of a programmable arrayed processing engine used to efficiently process data within an intermediate network station of a computer network. Notably, the L0 cache may assume various functions while providing an interface to, inter alia, an external memory of the station via a memory controller. That is, the L0 cache may function as a read buffer, a write buffer and/or a buffer for pending atomic commands, each of which is merged into a single memory bank that can be partitioned in any manner to enable efficient utilization.

According to an aspect of the invention, the technique provides an attribute based enhancement to prefetching that comprises, inter alia, various aging policies. For example, a specific aging policy may be associated with each cache line entry of the L0 cache to indicate when and under what circumstances the cache line should be invalidated. Each entry of the cache has its own attributes that are software-controlled using a novel prefetch attribute register to specify the nature of a memory access involving each cache line entry. The prefetch attribute register includes a lock group field, a no write back field, an exclusive field, an aging policy field and a length of data prefetched field. The attribute contents of these fields may be dynamically altered on a per phase basis and/or depending upon use of the data at a particular processor complex of the engine.

Another aspect of the invention involves a deferred store-through implementation of the L0 cache and, in particular, the paces of data written back through the memory controller to external memory. In this latter case, the L0 cache may function as a write buffer for writing data back to the external memory on a deferred basis and at a predefined rate. The prefetch register may be extended to include a write back attribute specifying a write back priority/rate of data from the cache to external memory. The predefined rate may be determined by the usable arbitration cycles available to each cache when arbitrating for access to the common external memory.

BRIEF DESCRIPTION OF THE DRAWINGS

The above and further advantages of the invention may be better understood by referring to the following description in conjunction with the accompanying drawings in which like reference numbers indicate identical or functionally similar elements.

DETAILED DESCRIPTION OF AN ILLUSTRATIVE EMBODIMENT

Figure 1:
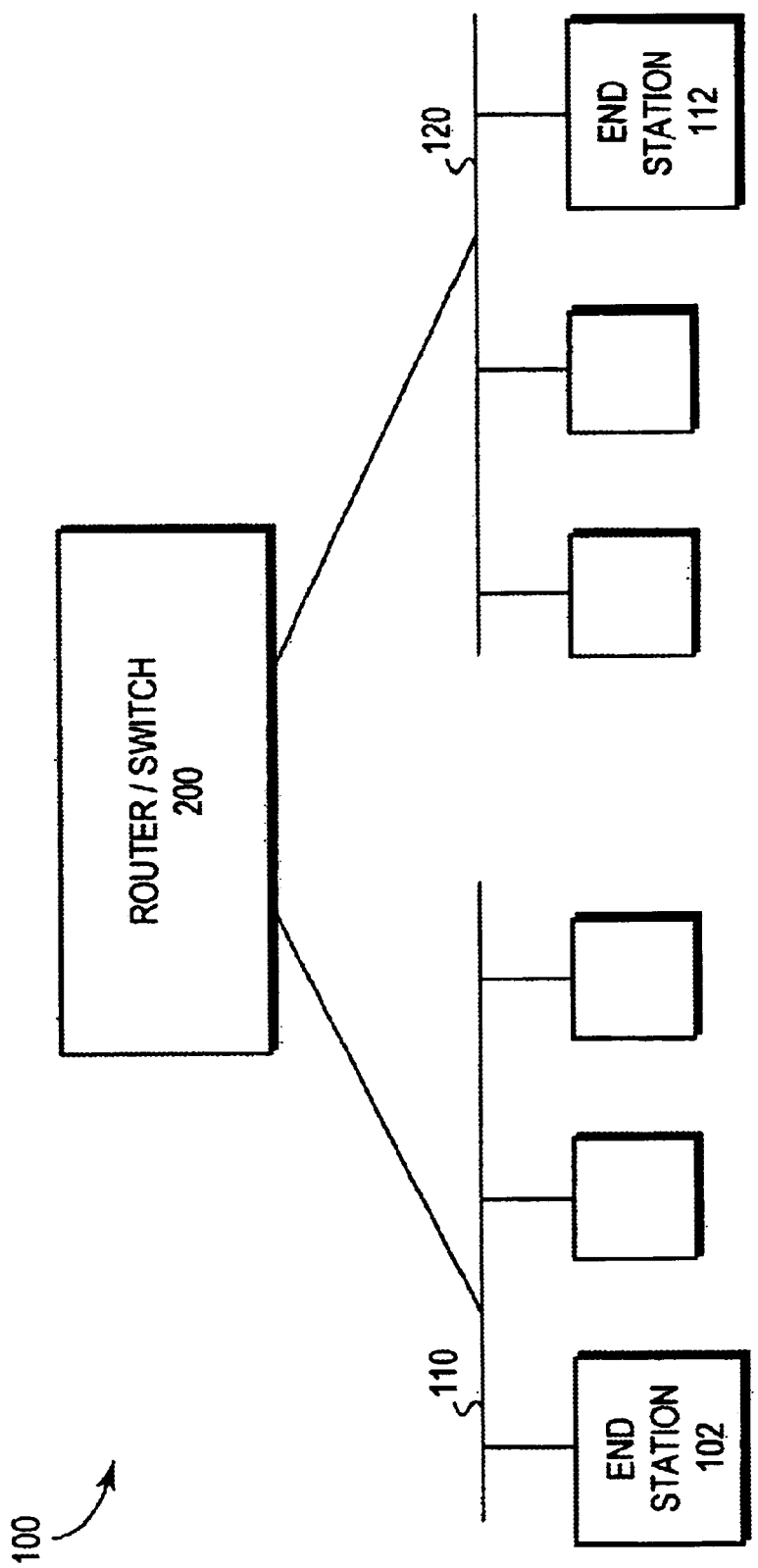
FIG. 1 is a block diagram of a computer network comprising a collection of interconnected communication media and subnetworks attached to a plurality of stations.

FIG. 1 is a block diagram of a computer network 100 comprising a collection of interconnected communication media and subnetworks attached to a plurality of stations. The stations are typically computers comprising end stations 102, 112 and intermediate station 200. The intermediate station 200 may be a router or a network switch, whereas the end stations 102, 112 may include personal computers or workstations. The subnetworks generally comprise local area networks (LANS) 110 and 120, although the invention may work advantageously with other communication media configurations such as point-to-point network links. Communication among the stations of the network is typically effected by exchanging discrete data frames or packets between the communicating nodes according to a predefined protocol. For the illustrative embodiment described herein, the predefined protocol is the Internet protocol (IP), although the invention could be implemented with other protocols, such as the Internet Packet Exchange protocol, AppleTalk protocol or DECNet protocol.

Figure 2:
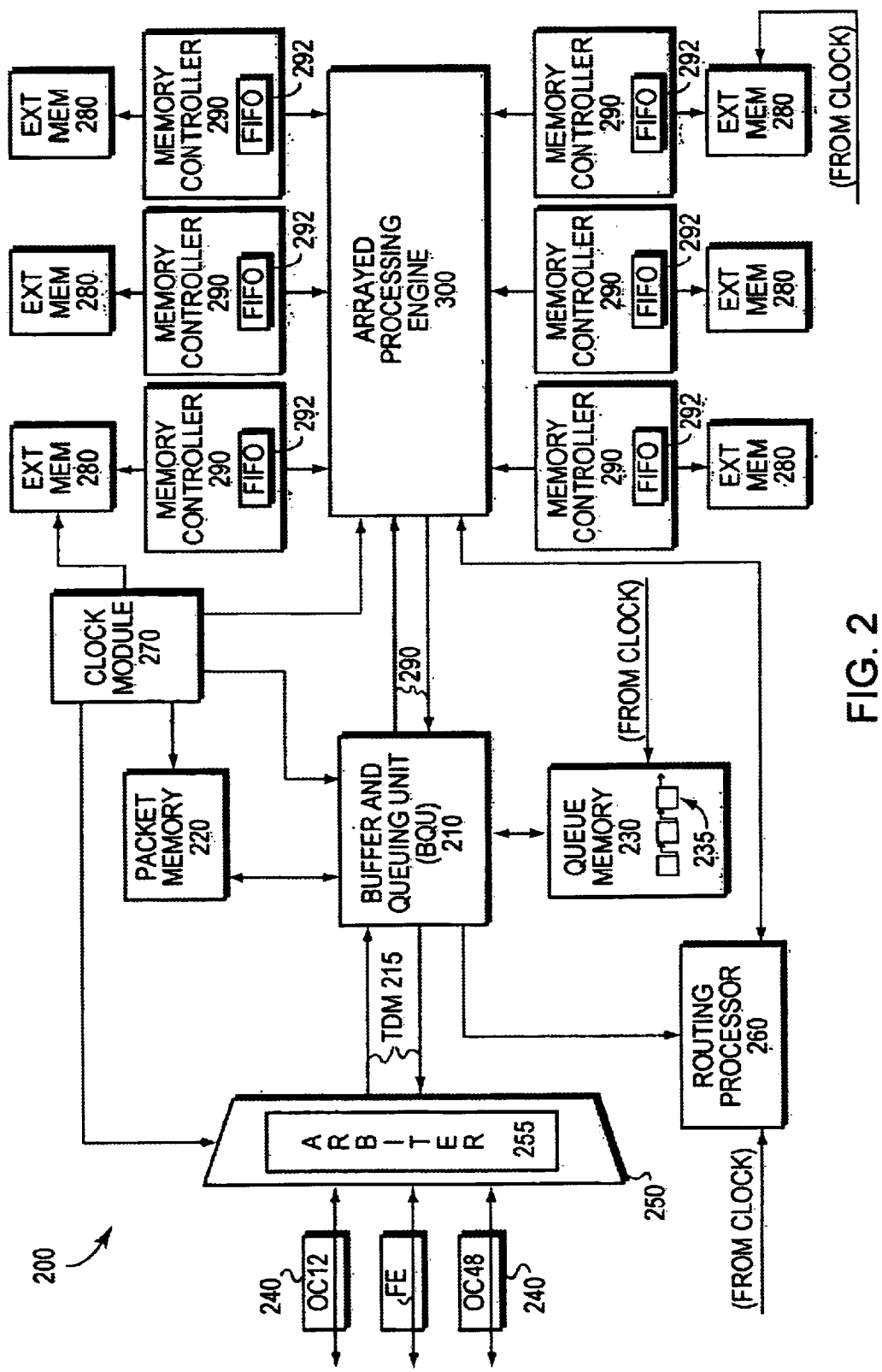
FIG. 2 is a schematic block diagram of intermediate station, such as a network switch, that may be advantageously used with the present invention.

FIG. 2 is a schematic block diagram of intermediate station 200 which, in the illustrative embodiment, is preferably a network switch. The switch generally performs layer 2 processing functions, such as "cut-through" operations wherein an entire frame does not have to be stored before transfer to a destination; in addition, switch 200 may implement layer 3 forwarding operations. It should be noted, however, that the intermediate station may also be configured as a router to perform layer 3 route processing. A feature of the inventive architecture described herein is the ability to program the station for execution of either layer 2 and layer 3 operations. To that end, operation of the switch will be described with respect to IP switching of packets, although the switch may be programmed for other applications, such as data encryption.

The switch 200 comprises a plurality of interconnected components including an arrayed processing engine 300, various memories, queueing logic 210 and network port interface cards 240. Operations of these components are preferably synchronously controlled by a clock module 270 although the arrayed elements of the processing engine may be operatively configured to function asynchronously. In the illustrative embodiment, the clock module 270 generates clock signals at a frequency of 200 megahertz (i.e., 5 nanosecond clock cycles) and globally distributes them via clock lines to the components of the switch.

The memories generally comprise random access memory (RAM) storage locations addressable by the processing engine and logic for storing software programs and data structures accessed by the components. An operating system, portions of which are typically resident in memory and executed by the engine, functionally organizes the switch by, inter alia, invoking network operations in support of software processes executing on the switch. It will be apparent to those skilled in the art that other memory means, including various computer readable media, may be used for storing and executing program instructions pertaining to the operation of the switch.

The arrayed processing engine 300 is coupled to a memory partitioned into a plurality of external memory (Ext Mem) resources 280. A buffer and queuing unit (BQU) 210 is connected to a packet memory 220 for storing packets and a queue memory 230 for storing network layer headers of the packets on data structures, such as linked lists, organized as queues 235. The BQU 210 further comprises data interface circuitry for interconnecting the processing engine with a plurality of line cards 240 via a selector circuit 250 having an arbiter 255. The line cards 240 may comprise, e.g., OC12, OC48 and Fast Ethernet (FE) ports, each of which includes conventional interface circuitry that incorporates the signal, electrical and mechanical characteristics, and interchange circuits, needed to interface with the physical media and protocols running over that media. A typical configuration of the switch may include many input/output channels on these interfaces, each of which is associated with at least one queue 235 in the queue memory 230. The processing engine 300 generally functions as a switching processor that modifies packets and/or headers in sequence as the BQU 210 implements queuing operations.

A routing processor (RP) 260 executes conventional routing protocols for communication directly with the processing engine 300. The routing protocols generally comprise topological information exchanges between intermediate stations to determine optimal paths through the network based on, e.g., destination IP addresses. These protocols provide information used by the RP 260 to create and maintain routing tables. The tables are loaded into the external partitioned memories 280 as forwarding information base (FIB) tables used by the processing engine to perform forwarding operations. When processing a header in accordance with IP switching, the engine 300 determines where to send the packet by indexing into the FIB using an IP address of the header. Execution of the forwarding operations results in destination media access control (MAC) addresses of the headers being rewritten by the processing engine to identify output ports for the packets.

Figure 3:
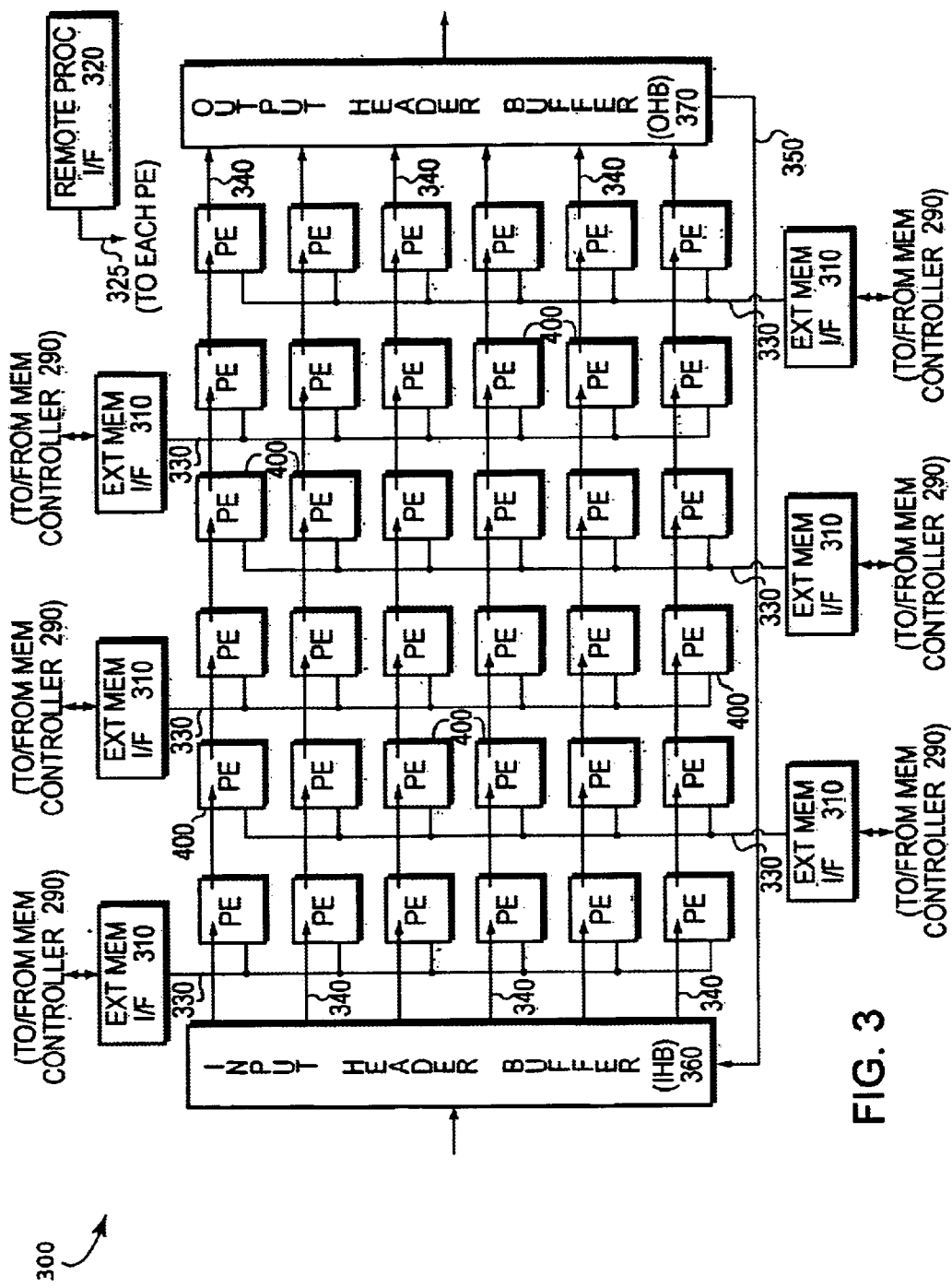
FIG. 3 is a schematic block diagram of a programmable arrayed processing engine having a plurality of processor complex (PE) elements.

FIG. 3 is a schematic block diagram of the programmable processing engine 300 which generally comprises an array of processing elements embedded between input and output header buffers with a plurality of interfaces 310 from the array to partitions of an external memory. The external memory stores non-transient data organized within data structures for use in processing the transient data. The non-transient data typically includes "table" data contained in forwarding and routing tables, statistics, access filters, encryption keys and/or queuing information. Transient data enters and exists the engine via 100 MHz 64-bit input and output data interfaces of the BQU 210. Each processing element contains an instruction memory that allows programming of the array to process the transient data as baseline or extended pipelines operating in parallel. A remote processor interface (I/F) 320 provides instructions from a remote processor (not shown) to the PEs over a 32-bit maintenance bus 325 having multiplexed address/data lines for storage in their instruction memories.

In the illustrative embodiment, the processing engine 300 comprises a plurality of processing elements (PE) 400 symmetrically arrayed as six (6) rows and six (6) columns in a 6×6 arrayed configuration that is embedded between an input header buffer (IHB) 360 and an output header buffer (OHB) 370; however, it should be noted that other configurations, such as a 4×4 arrayed configuration, may be advantageously used with the present invention. A 64-bit feedback path 350 couples the OHB 370 to the IHB 360 and provides a data path for recycling data through the PE stages of the processing engine. The PEs of each row are configured as stages connected in series by a 100 MHz 64-bit direct memory access (DMA) data path 340 that synchronously transfers data and control "context" from one PE to the next. Specifically, the processing elements of each row are configured as stages of a pipeline that sequentially execute operations on the transient data loaded by the IHB 360, whereas the processing elements of each column operate in parallel to perform substantially the same operation on the transient data, but with a shifted phase. An example of an arrayed processing engine and network switch suitable for use with the present invention is described in copending and commonly-owned U.S. patent application Ser. No. (09/106,478) titled Programmable Arrayed Processing Engine Architecture for a Network Switch.

Because they perform similar functions, the columned PEs require similar non-transient "table" data. Therefore, the external memory is partitioned into a plurality of external memory (Ext Mem) resources 280, each of which is dedicated to a respective column of PEs and further configured with transient table needed to support the similar function performed by the columned processor elements. Referring again to FIG. 2, each column has an associated memory controller 290 coupled to a 200 MHz 32-bit external memory interface data path (Ext Mem I/F) 310 for accessing the non-transient data.

Figure 4:
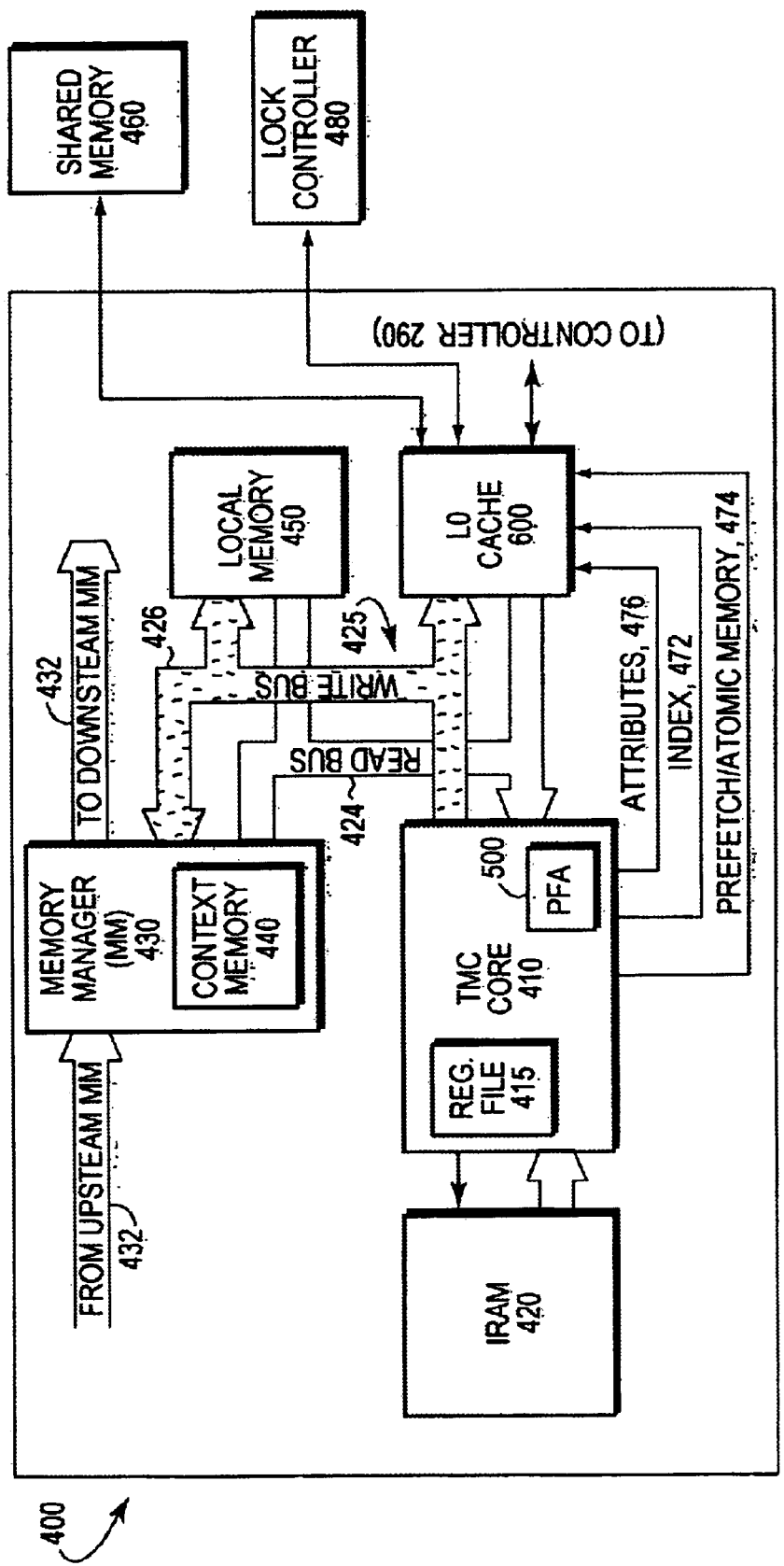
FIG. 4 is a schematic block diagram of a PE element comprising a processor core with internal registers used to implement a prefetching technique according to the present invention.

FIG. 4 is a schematic block diagram of a PE 400. The PE is a processor complex comprising a processor 410 coupled to an instruction memory (IRAM) 420 and a memory manager (MM) circuit 430. The IRAM 420 stores instructions for execution by the processor 410, which is preferably a customized microcontroller (TMC) core having a dense structure which enables implementation of similar cores on an application specific integrated circuit (ASIC). It will be apparent to those skilled in the art, however, that other processor cores may be advantageously used with the processor complex architecture described herein. The TMC core 410 includes a plurality of arithmetic logic units (ALUs, not shown), a register file 415 having a plurality of 32-bit internal registers (e.g., 15 entries) for storing intermediate result information processed by the ALUs, and an instruction fetch and decode unit (not shown) that decodes instructions fetched from the IRAM. The intermediate results are passed among PE stages 400 of the engine 300 over a consistent data path channel 432 provided by the MM 430. The TMC also supports fast task context switching to enable software pipelining across multiple cores.

In the illustrative embodiment, the TMC core 410 uses a 64-bit instruction word to operate on multiple 32-bit data values. Logical operations are performed on indirect memory operands to improve the overall density of the instruction code by merging arithmetic instructions with load/store instructions into one instruction. Broadly stated, multiple opcodes of differing widths can be encoded in a fixed length instruction word. Each instruction word contains two major opcodes and up to three minor opcodes (microps) that execute in parallel. Instruction level parallelism is scheduled by software as opposed to hardware, thereby eliminating the need for hardware-based schedulers while enabling completion of multiple instructions per cycle. An instruction set architecture provides micro-opcodes to initiate memory prefetches without requiring a dedicated instruction.

A 64-bit local bus 425 (comprising a read bus portion 424 and a write bus portion 426) interconnects the TMC core with a context memory 440, a local memory 450 and a level zero (L0) cache 600, the latter of which is attached to a shared memory 460. The local bus 425 can sustain one 64-bit read operation and one 64-bit write operation per cycle for data aligned on a 4-byte boundary. The maximum sustainable rate for non-aligned data accesses is one 32-bit read operation and one 32-bit write operation per clock cycle. The TMC core may directly access locations in the context memory 440 and the local memory 450 using an operand address associated with an instruction. Notably, the context memory 440 and the local memory 450 support zero wait state non-aligned accesses; accordingly, there is generally no performance difference when accessing data in the context memory 440 or the internal register file 415 of the TMC core.

In the illustrative embodiment, the memories 440–460 and cache 600 cooperate to provide a high-performance memory subsystem used exclusively for data storage and adapted for hierarchical memory configurations that is "viewable" by the TMC 410. Specifically, the TMC core has a 32-bit address space that is divided into four (4) regions across the memory subsystem. The context memory 440 resides in a first 512 byte region of a memory map and the local memory 450 resides in the next 512 byte region of the map. Context memory 440 stores transient "context" data (e.g., packet data) flowing through the PE 400 that is unique to a specific process, whereas the local memory 450 is configured to store, inter alia, pointers that reference data structures and tables stored in external memory 280 for use by the TMC core 410. Management of the context sensitive memory is provided by the MM 430, which comprises data path and control logic for cooperating with the context memory 440 to efficiently pass data among the PE stages of the processing engine.

The remaining address space is divided between the internal shared memory 460, which is shared among the columned TMC cores of the processing engine, and an external memory region 280, each of which is accessed via the L0 cache 600. An address decoder (not shown) of the TMC 410 decodes an address request to the internal shared memory. Since the memory 460 is shared among other TMC cores of a column, arbitration is required to access the memory and, accordingly, there may be a latency penalty associated with a TMC 410 missing its arbitration "slot". The latency penalty may be at least three cycles and possibly more depending upon the number of TMC cores "queued" before the particular processor.

The L0 cache 600 may be a fully associative, multiport data cache that provides various caching and buffering functions for the external memory 280 and shared memory 460 to thereby increase the overall bandwidth and efficiency of the TMC 410. Because of its inherent associativity, the L0 cache requires the use of tags and control information to access data stored in each of its cache line entries. In an embodiment of the invention, the cache may have 8 cache line entries with each cache line having a size of 16 bytes (as opposed to a typical 32-byte cache line). Specifically, the L0 cache may operate as a read first in-first out (FIFO) buffer, a write buffer or a buffering mechanism for pending atomic commands when interfacing to external memory 280 via the memory controller 290. Advantageously, each of these functions is merged into a single memory bank of the cache 600 that can be partitioned in any manner to enable efficient utilization.

The TMC 410 utilizes prefetching operations to avoid delays associated with accessing the L0 cache 600. Data stored in the external and shared memories are prefetched through the cache. In particular, the invention provides an attribute based enhancement to prefetching that allows control of the internal activities of the cache without relying on conventional algorithms, such as a least recently used (LRU) algorithm. The TMC architecture defines a plurality of opcodes for cache control and provides a prefetch interface for software to specify the amount of data required for a prefetch operation along with attributes relating to, e.g., the cache's aging policy and coherency requirements. Thus, the invention enables software control over caching and coherency issues (rather than utilizing hardware-based solutions), while also providing a finer granularity of prefetch control than prior systems.

Specifically, the attribute based prefetching enhancement comprises, inter alia, various aging policies. For example, a specific aging policy may be associated with each cache line entry of the L0 cache to indicate when and under what circumstances the cache line should be invalidated. Each entry of the cache has its own attributes that are software-controlled using a novel prefetch attribute register 500 to specify the nature of a memory access involving each cache line entry. The prefetch attribute register (pfa) is an internal register contained in the TMC 410 that explicity specifies the nature of a memory access involving an entry of the cache, as opposed to inferring the nature of the access based on previous accesses, as in the prior art. A prefetch attribute bus 476 couples the pfa 500 to the L0 cache and a plurality (e.g., at least 10-bits) of attribute information stored in the register.

Figure 5:
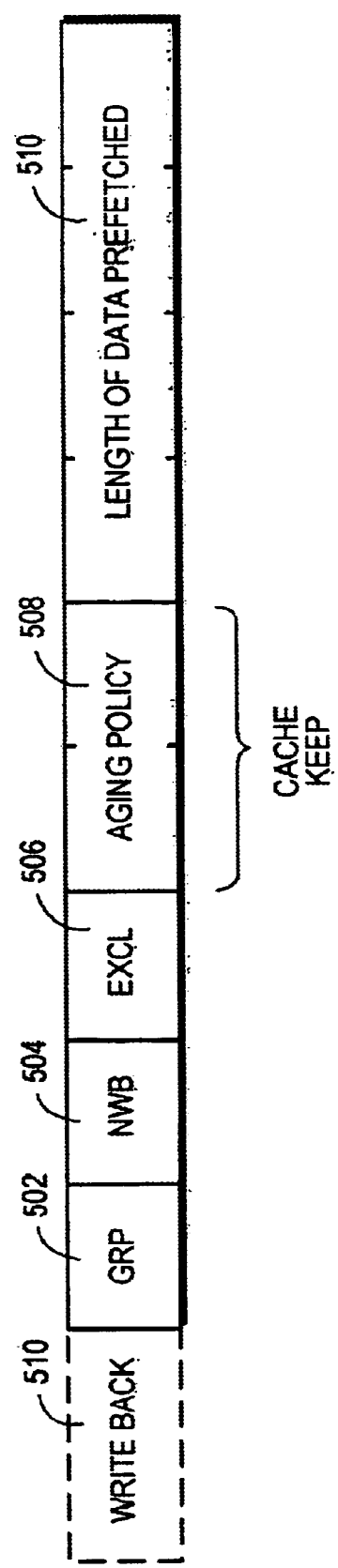
FIG. 5 is a schematic block diagram of an internal prefetch register having attributes for controlling a level zero (L0) cache according to the present invention.

FIG. 5 is a schematic block diagram of the prefetch register 500 having attributes that can be specified via software. The prefetch attribute register includes a lock group (GRP) field 502, a no write back (NWB) field 504, an exclusive (EXCL) field 506, an aging policy field 508 and a length of data prefetched field 510. The contents of these fields represent attributes that may be dynamically altered on a per phase basis and/or depending upon use of the data at a particular PE stage of the engine. For example, an index only signal may be issued by the TMC 410 to the L0 cache during a read or write operation specifying an index for use by the cache 600, as described herein. A 4-bit index bus 472 carries the index from the TMC 410 to the cache 600 to identify a location in the cache for coordinating results. When index only mode is specified during a prefetch operation, the NWB attribute is asserted to conserve use of an internal register, which ordinarily would store the address of the cache location. In particular, the asserted NWB attribute modifies normal TMC instruction execution by specifying that the internal (destination) register need not to be updated.

The fully associative arrangement of the L0 cache guarantees that an entry can be found anywhere in the cache as long as it is not reserved. Such an arrangement allows all tag entries to be compared in parallel with a read address; however, the timing constraints of the cache may not be sufficient to meet the access time of the TMC core 410. For example, when an n-way compare operation is performed in the cache for all entries, a cache "hit" result must be provided to the TMC core over a time critical return path of the hit logic. The hit indication must be returned fairly quickly (e.g., 3–4 nanoseconds cycle time) relative to the TMC core's ability to suspend execution of its internal pipeline. This is generally too fast for the conventional comparators of a cache. As a result, the inventive technique provides an index to the cache which effectively disables its associativity by instructing the cache to access data at a particular cache line location.

Figure 6:
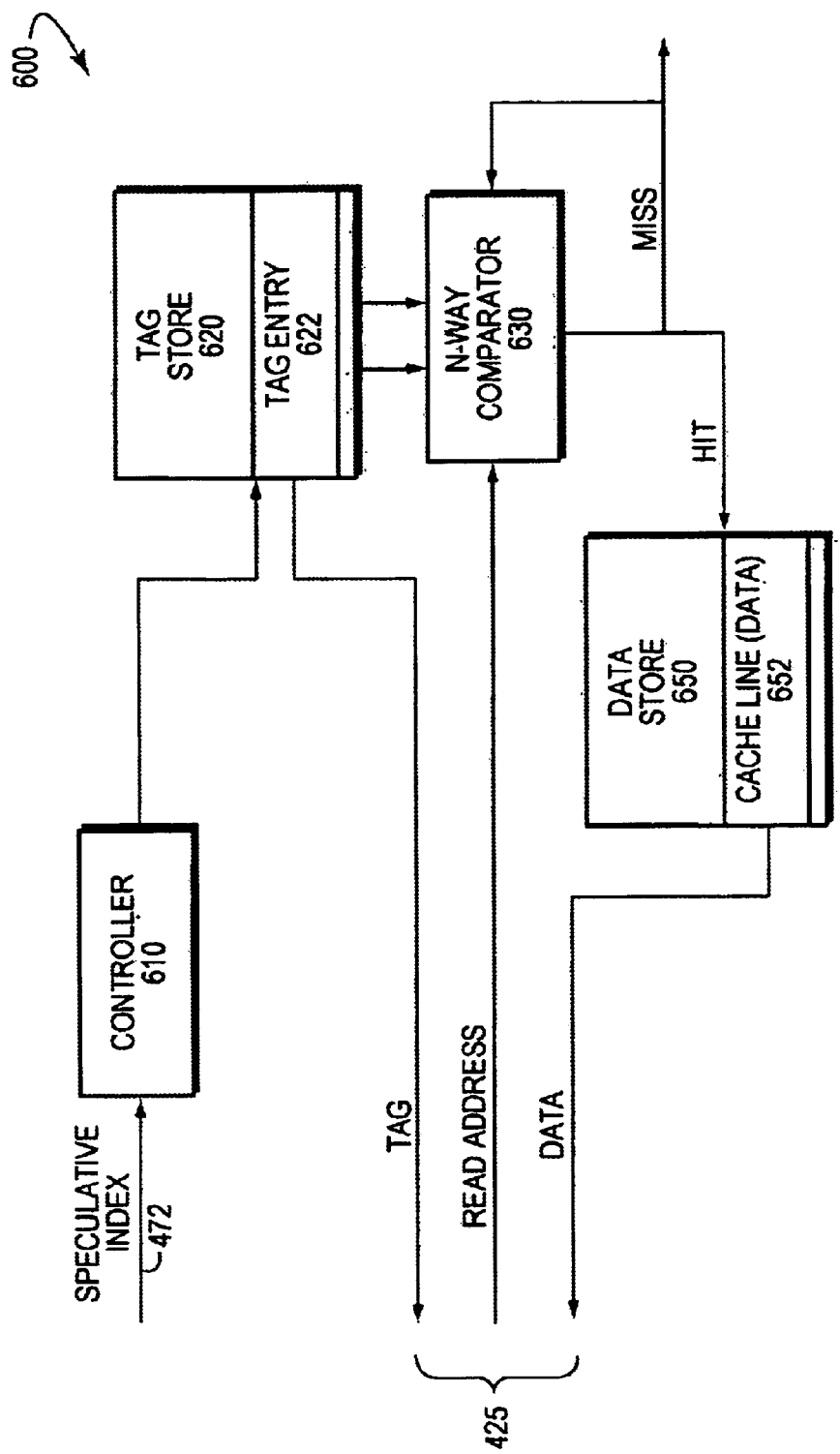
FIG. 6 is a schematic block diagram of the L0 cache for use with the present invention.

FIG. 6 is a schematic block diagram of the L0 cache 600 including a controller 610, a tag store 620 and a data store 650. The TMC 410 issues an index over the index bus 472 to the controller 610 which uses the index to select a particular tag entry 622 from the tag store 620. The selected tag entry 622 is compared with a read address issued by the TMC over the local bus 425 to an n-way comparator circuit 630. If the tag comparison operation results in a "hit", the selected tag 622 is used to access a data cache line 652 from the data store 650. The cache line 652 and the selected tag entry 622 are then provided to the TMC 410 over the bus 425.

According to the inventive technique, if the data is located at the index, there are zero wait states associated with the cache access and the data is returned to the TMC immediately. The index thus provides an initial attempt to return data in a very efficient manner. However if a "miss" output results from the comparator 630 because the selected tag did not compare favorably with the read address, the full n-way compare logic is utilized in a next cycle to determine whether there truly is a matching tag entry in the tag store 620.

Referring again to FIG. 5, the 2-bit aging policy field 508 provides four possible attribute states that describe aging policies associated with the cache lines. Two aging policies are defined by a "cache" attribute that indicates whether the entry is cacheable and two other policies are defined by a "keep" attribute that indicates whether the entry should be kept after a context switch. For example, assertion of the cache bit attribute specifies a normal aging (LRU) policy, whereas non-assertion of that attribute dictates an invalidate-on-read policy. Assertion of the bit associated with the keep attribute does not invalidate the cache line on context switch, whereas non-assertion of that bit invalidates the cache line on context switch. These attributes may thus be applied to create a persistent cache memory if, e.g., the cache lines are not invalidated on context switch and are allowed to age normally.

The length of data prefetched field 510 contains a 4-bit attribute that specifies the length of data prefetched. Notably, the invention allows prefetching of enough data to effectively fill the L0 cache 600. That is, the data length attribute may specify prefetching of up to 8 data words (each having a length of 16 bytes) for the cache line entries using a single instruction; however, the attributes associated with each cache line are the same and are specified in the prefetch attribute register. In an alternate embodiment, up to 16 words can be prefetched (wherin each word comprises 8 bytes).

The EXCL attribute 506 specifies whether data coherency synchronization is required. There are several mechanisms that may be used to ensure data coherency among the columned TMC cores of the engine; in the illustrative embodiment, the mechanism is preferably a locking semaphore. The EXCL attribute provides a 1-bit enhancement that obviates the need for additional instructions to execute the "lock". Specifically, the attribute specifies prefetching of a particular address and marking of that entry/location as exclusive to thereby ensure the only valid copy of the data item at that location. Implementation of the exclusive/ownership policy may also be realized through conventional snooping algorithms or conventional data directories coupled to the PE caches of a column within the engine.

As noted, the TMCs of a column operate on substantially the same data that is accessible from a common dedicated partitioned external memory 280, which is serviced by the L0 caches of the column. Therefore, exclusive entries indicate that memory coherency is required among all of the caches in that column. Exclusive entries are managed by a lock controller 480 which preferably implements the locking semaphore at a granularity that is larger than a cache line-based lock, but smaller (more granular) than locking the entire external memory. In the illustrative embodiment, a maximum of six (6) exclusive entries may be active at a time in the column; however, this number is dependent upon the number of rows in a column such that, for the 4×4 arrayed configuration of processing elements 400, the maximum number of active entries would be four (4).

The EXCL attribute 506 indicates that a lock is associated with a particular entry and generally operates in connection with the GRP attribute 502, which identifies the lock to be released when the memory subsystem acknowledges a write request. For example, to reserve an exclusive entry, a lock is acquired from the lock controller 480 by way of a TMC virtual semaphore instruction xgvs. Upon successfully obtaining the lock, the GRP and EXCL attributes are updated (e.g., asserted) in the pfa register 500. The prefetch operation is then issued and, based on the state of the attribute register after the write operation completes, the entry is invalidated and the lock is released.

Atomic operations, which are supported by the memory controller 290, also impact data coherency. In fact, use of atomic operations may yield better performance than cache line-based locking mechanisms. A prefetch bus 474 couples the TM core 410 to the memory controller 290 and includes two select modes for transporting 32-bits of information associated with (i) prefetching of data or (ii) issuing of atomic commands. When prefetching data, the L0 cache functions as read buffer; yet as noted, the L0 cache may also function as a write buffer to the external memory, particularly when functioning as a mechanism for controlling atomic operations. For this latter function, state information (in the form of a reserve cache control bit) reserves a cache line entry in the cache 600 for atomic operations. When the TMC core 410 issues a specific index for an atomic operation over the index bus 472 to the cache, the reserved cache entry may be used for that operation.

The atomic command is an atomic memory operator (such as a read-modify-write operation or a read-and-clear operation) directed to a remote location in the external memory that is of interest to the memory controller 290. The information carried on the prefetch bus 474 is staged at a reserved location in the cache to coordinate results of the atomic operation, thereby enabling support of multiple outstanding atomic requests. In addition, the bus 474 carries information specifying the function of the cache for those results, e.g., a buffer for pending atomic commands at the memory controller. Accordingly, the L0 cache functions as an intermediary to post atomic command status or to return data rather than functioning as a prefetch buffer.

Indeed, the L0 cache may operate as a deferred store-through cache when updating external memory in accordance with the atomic commands. Such a deferred store-through implementation may further support multiple outstanding write requests to the is external memory 280 without stalling the TMC core 410. A conventional store-through cache immediately propagates all write data through the cache into an external memory; however, the TMC core can write data to the cache 600 much faster than the memory controller can forward that data onto external memory. When operating in a deferred store-through mode, the L0 cache functions as a write buffer to temporarily stage the write data.

For example, assume the TMC core returns 8 cache line entries of write data to the L0 cache. If the cache operates as a conventional store-through cache, the memory controller attempts to write that data to external memory as a contiguous block of data utilizing every available bus cycle. A deferred store-through cache operation, on the other hand, does not require use of every available bus cycle to write back the data to external memory as one contiguous data transfer. This is particularly advantageous since a write operation to the external memory has a lower priority in terms of arbitration for that memory.

It should be noted that the novel attribute-based prefetching technique enhances the performance of either a store-through or deferred store-through cache implementation. Yet, the deferred store-through cache implementation also enhances the memory utilization performance of the memory controller interface (i.e., bus) to external memory. That is, the deferred store-through implementation of the L0 cache allows defining of the pace of write back data through the memory controller 290 to external memory 280. Here, the L0 cache again functions as a write buffer for writing data back to the external memory on a deferred basis and at a pre-defined rate as opposed to utilizing all of the available bus cycles and bandwith to return the data as one contiguous block. The pre-defined rate may be determined by the usable arbitration cycles available to each cache when arbitrating for access to the external memory (recall that there may be five other caches of the columned PE stages vying for access to that shared resource).

Accordingly, another attribute associated with the prefetch attribute register may be contained in a write back field 512 that specifies a write back priority of the L0 cache 600. In the illustrative embodiment, the write back priority attribute is manifested as a 1-bit field wherein the priority denotes a pre-defined write back rate; however, it will be apparent to those skilled in the art that a multi-bit (n) field may be used that specifies various priority levels/write back rates. Alternatively, the write back rate of the cache may be specified as a pre-configured cache management construct. Although the write back priority attribute is not necessarily associated with prefetching of data to the cache, it may comprise one of a set of attributes associated with write back operations to the external memory.

The memory controller 290 includes an internal FIFO 292 (FIG. 2) for storing multiple outstanding requests and commands. In the case of a write request, the FIFO stores the identification of the TMC core along with the index for accessing the cache. When the memory controller is ready to move data, it accesses the cache at the index and proceeds to transfer the data from the cache to itself without intervention by the TMC. For a read operation, the read address is written to (i) the cache at a location that is marked invalid and (ii) the memory controller. Thereafter, during a prefetch operation, the memory controller copies the data contents into the cache at the read address location. Note that execution of the read instruction operates transparently to the prefetch instruction execution.

While there has been shown and described an illustrative embodiment for enabling control of internal activities of a cache memory by a processor without relying on conventional algorithms, it is to be understood that various other adaptations and modifications may be made within the spirit and scope of the invention. For example, performance of the cache may be further increased through the use of instructions defined by the TMC architecture. The operands defined by the processor architecture are displacement addresses associated with a defined base address; the 4-bit information carried over the index bus 472 may represent the base address used to form a memory address location in the L0 cache 600.

The following is an example of a TMC instruction written in TMC assembler notation: R4←R3+5; pfa(1). The two equations represent an instruction defined by the is TMC architecture that specifies adding an immediate value 5 to the contents of register 3 and storing the result in register 4. In addition, a micro-operation (micro-op) pfa specifies a prefetch operation with attributes on the results stored in register 4. The argument (1) associated with the pfa micro-operation specifies one of two attribute registers for use with the instruction.

Specifically, there are two prefetch attribute registers 500 (FIG. 5) supported by the TMC architecture, each of which can be specified by the micro-op pfa for use with an instruction without having to reload the registers. The prefetch micro-op causes the result of the calculation stored in register 4 to be written on the prefetch bus 474 and the contents of indicated prefetch attribute register #1 are written over the prefetch attribute bus 476, whereas the index bus 472 carries a value of 4 (for R4) as the index into the cache. Thus, the instruction specifies to the cache a location 4 for storing the prefetch data if that location is not currently occupied with other data. If the location is currently occupied, the index is not appropriate and the cache controller determines an index into the cache for storing the data using a conventional fully associative cache operation.

Referring to the TMC notation example, the results of the prefetch operation are stored in register 4 and, after waiting for a prefetch latency period of approximately 10 cycles, those results may be used. A next instruction notation is represented as R5←(R4)+R1. Here, register 4 (R4) is the source operand so for the fetch operation, the index is 4. The information transported over the index bus 472 to the cache controller instructs the controller that the TMC is fetching from base register 4 (4 is the index) and, thus, the controller may access (read) the data at the tag specified by index 4.

Access to the proper data is confirmed by comparing addresses. If the proper data is confirmed, the data is provided to the TMC core 410 without delay over the bus 425. If R4 was not the actual index for the data, the n-way compare logic 630 is invoked and the bus 425 stalls for one cycle while the hit logic is examined to determine whether there is a hit in the cache. If there is a hit, the data is returned with a one cycle latency delay; otherwise, the TMC 410 is delayed until the cache miss is resolved. Thus, when prefetching data, there is either an immediate hit in the cache based on the index, a hit on the next cycle based on a subsequent compare or a miss in the cache, which requires a plurality of cycles (for example 10 cycles) to execute a cache miss routine and retrieve the data from external memory.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. Apparatus for enabling control of internal activities of a cache memory of a network switch, the cache memory having at least one cache line entry for storing data prefetched from one of an external and shared memory of the switch, the apparatus comprising:

a processor;

a cache memory, the cache memory to hold data in a line entry;

a prefetch attribute register contained within the processor, the attribute register including a plurality of fields, the plurality of fields referring to the line entry, the plurality of fields having attributes that specify a nature of data held in the cache line entry;

an exclusive field included in one of the plurality of fields, the exclusive field containing an exclusive attribute, the exclusive attribute indicating that a lock is associated with the exclusive entry; and another of the plurality of fields includes a lock group field containing an attribute that identifies the lock to be released in response to a write memory access operation.

2. The apparatus of claim 1 further comprising:

the cache memory provides various caching and buffering functions for the external and shared memories, and the various caching and buffering functions include a read buffer function, a write buffer function and a buffering function for pending atomic commands.

3. The apparatus of claim 1 further comprising:
one of the plurality of fields includes a no write back field containing an attribute that allows conservation of an internal register of the processor in response to an index only signal issued by the processor to the cache memory during a read or write operation.

4. The apparatus of claim 1 further comprising:
an exclusive field of one of the plurality of fields, the exclusive field containing an exclusive attribute that indicates whether data coherency synchronization is required.

5. The apparatus of claim 4 further comprising:
a locking semaphore to implement data coherency synchronization, and the exclusive attribute specifies a prefetch memory access operation to the cache entry and marking of the entry as exclusive to thereby ensure an only valid copy of data at that location.

6. The apparatus of claim 5 further comprising:
a lock controller to manage the exclusive entry.

7. The apparatus of claim 2 wherein one of the plurality of fields comprises a length of data prefetched field containing a multi-bit attribute that specifies a length of data prefetched into the cache from the external memory.

8. The apparatus of claim 1 wherein one of the plurality of fields comprises an aging policy field containing at least one attribute that describes one of a plurality of aging policies associated with the cache line entry.

9. The apparatus of claim 8 wherein the at least one aging attribute is a cache attribute that indicates whether the cache line entry is cacheable.

10. The apparatus of claim 8 wherein the at least one aging attribute is a keep attribute that indicates whether the cache line entry is maintained in the cache after a context switch.

11. The apparatus as in claim 1 wherein the nature of data held in the cache line entry further comprises: a write back policy indicator.

12. The apparatus as in claim 1 wherein the nature of data held in the cache line entry further comprises: a lockgroup indicator.

13. The apparatus as in claim 1 wherein the nature of data held in the cache line entry further comprises: a no write back indicator bit.

14. The apparatus as in claim 1 wherein the nature of data held in the cache line entry further comprises: an exclusive entry indicator.

15. The apparatus as in claim 1 wherein the nature of data held in the cache line entry further comprises: an aging policy.

16. The apparatus as in claim 1 wherein the nature of data held in the cache line entry further comprises: a length of data prefetched to the cache line entry.

17. Apparatus for enabling control of internal activities of a cache memory of a network switch, the cache memory having at least one cache line entry for storing data prefetched from one of an external and shared memory of the switch, the apparatus comprising:
a processor;
a cache memory, the cache memory to hold data in a line entry;
a prefetch attribute register contained within the processor, the attribute register including a plurality of fields, the plurality of fields referring to the line entry, the plurality of fields having attributes that specify a nature of data held in the cache line entry;
an exclusive field included in one of the plurality of fields, the exclusive field containing an exclusive attribute that indicates whether data coherency synchronization is required, and the exclusive attribute specifies a prefetch memory access operation to the cache entry and marking of the entry as exclusive, to thereby ensure an only valid copy of data at that location, and the exclusive attribute further indicates that a lock is associated with the exclusive entry; and another of the plurality of fields includes a lock group field containing an attribute that identifies the lock to be released in response to a write memory access operation.

18. A method for prefetching data from one of an external and shared memory of a processing engine of an intermediate network station, the method comprising the steps of:
servicing the external shared memories with a cache memory having a plurality of cache line entries for storing data transferred to and from the memories; and
controlling internal activities of the cache memory with a prefetch attribute register contained within a processor of the processing engine;
indicating by an exclusive attribute in an exclusive field of the plurality of fields, that a lock is associated with the exclusive entry; and
including a lock group field in another exclusive field of the plurality of fields, the lock group field containing an attribute that identifies the lock to be released in response to a write memory access operation.

19. The method of claim 18 further comprising:
specifying a nature of a memory access to each cache line entry using attributes contained in fields of the attribute register.

20. The method of claim 18 further comprising:
using the cache memory as a write buffer; and
specifying a write back priority for transferring data stored in a L0 cache to one of a plurality of external and shared memories using a write back attribute of the attribute register.

21. The method of claim 19, further comprising:
specifying one of a plurality of aging policies associated with the cache line entry using attributes of an aging policy field of the attribute register.

22. A method for prefetching data from one of an external and shared memory of a processing engine of an intermediate network station, the method comprising the steps of:
servicing the external and shared memories with a cache memory having a plurality of cache line entries for storing data transferred to and from the memories;
controlling internal activities of the cache memory with a prefetch attribute register contained within a processor of the processing engine;
specifying a nature of a memory access to each cache line entry using attributes contained in fields of the attribute register;
specifying one of a plurality of aging policies associated with the cache line entry using attributes of an aging policy field of the attribute register;
asserting a first attribute to specify a normal aging policy, such as a least recently used policy; and
deasserting the first attribute to specify an invalidate-on-read policy.

23. The method of claim 22 wherein the step of specifying further comprises the steps of:
asserting a second attribute to obviate invalidation of the cache line entry on a context switch; and
deasserting the second attribute to invalidate the cache line entry on the context switch.

24. A system for prefetching data from one of an external and shared memory of a processing engine of an intermediate network station, the system comprising:
- a cache memory having a plurality of cache line entries, the cache memory servicing the external and shared memories;
- a processor coupled to the cache memory;
- a prefetch attribute register contained within the processor, the attribute register enabling control of internal activities of the cache memory and including a plurality of fields having attributes that specify a nature of a memory access to each cache line entry;
- an exclusive field included in one of the plurality of fields, the exclusive field containing an exclusive attribute, the exclusive attribute indicating that a lock is associated with the exclusive entry; and
- another of the plurality of fields includes a lock group field containing an attribute that identifies the lock to be released in response to a write memory access operation.

25. The system of claim 24 wherein the cache memory is a fully associative cache.

26. The system of claim 24 wherein the cache memory is a deferred store-through level zero cache.

27. An apparatus for enabling control of internal activities of a cache memory of a network switch, the cache memory having at least one cache line entry for storing data prefetched from one of an external and shared memory of the switch, the apparatus comprising:
- a processor;
- a cache memory, the cache memory to hold data in a line entry; and, means for controlling internal activities of the cache memory with a prefetch attribute register contained within the processor, the attribute register including a plurality of fields, the plurality of fields referring to the line entry, the plurality of fields having attributes that specify a nature of data held in the cache line entry;
- means for indicating by an exclusive attribute in an exclusive field of the plurality of fields, that a lock is associated with the exclusive entry; and
- means for including a lock group field in another exclusive field of the plurality of fields, the lock group field containing an attribute that identifies the lock to be released in response to a write memory access operation.

28. A computer readable media containing computer instructions for the practice of a method for prefetching data from one of an external and shared memory of a processing engine of an intermediate network station, the methods comprising the steps of:
- Servicing the external and shared memories with a cache memory having a plurality of cache line entries for storing data transferred to and from the memories;
- Controlling internal activities of the cache memory with a prefetch attribute register contained within a processor of the processing engine;
- Indicating by an exclusive attribute in an exclusive field of the plurality of fields, that a lock is associated with the exclusive entry; and including a lock group field in another exclusive field of the plurality of fields, the lock group field containing an attribute that identifies the lock to be released in response to a Write memory access operation.

29. An electromagnetic signals propagating over a computer network, the electromagnetic signals carrying instructions for execution in a computer for the practice of a method for prefetching data from one of an external and shared memory of a processing engine of an intermediate network station, the methods comprising the steps of:
- Servicing the external and shared memories with a cache memory having a plurality of cache line entries for storing data transferred to and from the memories;
- Controlling internal activities of the cache memory with a prefetch attribute register contained within a processor of the processing engine;
- Indicating by an exclusive attribute in an exclusive field of the plurality of fields, that a lock is associated with the exclusive entry; and including a lock group field in another exclusive field of the plurality of fields, the lock group field containing an attribute that identifies the lock to be released in response to a write memory access operation.

30. A network switch, comprising:
- a processor;
- a memory, the memory shared with the processor and a plurality of other devices within the switch;
- a cache memory, the cache memory having at least one cache line entry for storing data prefetched from the memory by the processor;
- a prefetch attribute register, the attribute register including a plurality of fields, the plurality of fields referring to a specific line entry, the plurality of fields having attributes that specify a nature of data held in the cache line entry;
- a particular field of the plurality of fields, the particular field containing an attribute indicating that a lock is associated with the entry; and
- another of the plurality of fields includes a lock group field containing an attribute that identifies the lock to be released in response to a write memory access operation.

31. The switch of claim 30, further comprising:
the cache memory provides a read buffer function, a write buffer function, and a buffering function for pending atomic commands.

32. The switch of claim 30, further comprising:
one of the plurality of fields includes a no write back field containing an attribute that allows conservation of an internal register of the processor in response to an index only signal issued by the processor to the cache memory during a read or write operation.

33. The switch of claim 30, further comprising:
an exclusive field of one of the plurality of fields, the exclusive field containing an exclusive attribute that indicates whether data coherency synchronization is required.

34. The switch of claim 30, further comprising:
a locking semaphore to implement data coherency synchronization, and the exclusive attribute specifies a prefetch memory access operation to the cache entry and marking of the entry as exclusive to thereby ensure an only valid copy of data at that location.

35. The switch of claim 34, further comprising:
a lock controller to manage the exclusive entry.

36. The switch of claim 30, further comprising:
one of the plurality of fields includes a length of data prefetched field having a multi-bit attribute that specifies a length of data prefetched into the cache from the external memory.

37. The switch of claim 30, further comprising:
one of the plurality of fields has an aging policy field containing at least one attribute that describes one of a plurality of aging policies associated with the cache line entry.

38. The switch of claim 37, further comprising:
the at least one aging attribute is a cache attribute that indicates whether the cache line entry is cacheable.

39. The switch of claim 37, further comprising:
the at least one aging attribute is a keep attribute that indicates whether the cache line entry is maintained in the cache after a context switch.

40. The switch of claim 30, further comprising:
the cache memory is a fully associative cache.

41. The switch of claim 30, further comprising:
the cache memory is a deferred store through level zero cache.

42. The switch of claim 30, further comprising:
data held in the cache line entry is a write back policy indicator.

43. The switch of claim 30, further comprising:
data held in the cache line entry is a lockgroup indicator.

44. The switch of claim 30, further comprising:
data held in the cache line entry is a no write back indicator.

45. The switch of claim 30, further comprising:
data held in the cache entry is an exclusive entry indicator.

46. The switch of claim 30, further comprising:
the prefetch attribute register contained within the processor.

47. The switch of claim 30, further comprising:
an attribute contained in fields of the attribute register to specify a nature of a memory access to each cache line.

48. The switch of claim 30, further comprising:
the cache memory used as a write buffer; and
a write back attribute of the attribute register to specify a write back priority for transferring data stored in a L0 cache to one of a plurality of external shared memories.

49. The switch of claim 30, further comprising:
an attribute of an aging policy field of the attribute register to specify one of a plurality of aging policies associated with the cache line entry.

50. The switch of claim 30, further comprising:
a first attribute, when asserted, to specify a normal aging policy, such as a least recently used policy, and deasserting the first attribute to specify an invalidate-on-read policy.

51. The switch of claim 50, further comprising:
a second attribute, when asserted, to obviate invalidation of the cache line entry on a context switch, and deasserting the second attribute to invalidate the cache line entry on the context switch.

52. A method of operating a network switch, comprising:
having in the switch a processor, a memory, the memory is shared with the processor and a plurality of other devices within the switch, and a cache memory, the cache memory having at least one cache line entry for storing data prefetched from the memory by the processor;
referring to a specific line entry by a prefetch attribute register, the attribute register including a plurality of fields, the plurality of fields having attributes that specify a nature of data held in the cache line entry;
indicating by an attribute that a lock is associated with an entry; and
identifying by a lock group field that the lock is to be released in response to a write memory access operation.

53. The method of claim 52, further comprising:
providing by the cache memory a read buffer function, a write buffer function, and a buffering function for pending atomic commands.

54. The method of claim 52, further comprising:
including in one of the plurality of fields a no write back field containing an attribute that allows conservation of an internal register of the processor in response to an index only signal issued by the processor to the cache memory during a read or write operation.

55. The method of claim 52, further comprising:
indicating by an exclusive field of one of the plurality of fields whether data coherency synchronization is required.

56. The method of claim 52, further comprising:
implementing data coherency synchronization by a locking semaphore, and an exclusive attribute specifies a prefetch memory access operation to the cache entry to thereby ensure an only valid copy of data at that location.

57. The method of claim 52, further comprising:
managing an exclusive entry by a lock controller.

58. The method of claim 52, further comprising:
specifying a length of data prefetched into the cache from the external memory by a length of data prefetched field, the length of data prefetched field being one of the plurality of fields.

59. The method of claim 52, further comprising:
describing one of a plurality of aging policies associated with the cache line entry by an aging policy field, the aging policy field being one of the plurality of fields.

60. The method of claim 52, further comprising:
indicating whether the cache line entry is cacheable by a cache attribute.

61. The method of claim 52, further comprising:
indicating whether the cache line entry is maintained in the cache after a context switch by a keep attribute.

62. The method of claim 52, further comprising:
having the cache memory as a fully associative cache.

63. The method of claim 52, further comprising:
having the cache memory as a deferred store through level zero cache.

64. The method of claim 52, further comprising:
indicating a write back policy by data held in the cache line entry.

65. The method of claim 52, further comprising:
indicating a lockgroup by data held in the cache line entry.

66. The method of claim 52, further comprising:
indicating a no write back by data held in the cache line entry.

67. The method of claim 52, further comprising:
indicating an exclusive entry by data held in the cache entry.

68. The method of claim 52, further comprising:
containing the prefetch attribute register within the processor.

69. The method of claim 52, further comprising:
specifying a nature of a memory access to each cache line entry using attributes contained in fields of the attribute register.

70. The method of claim 52, further comprising:

using the cache memory as a write buffer; and specifying a write back priority for transferring data stored in a L0 cache to one of a plurality of external shared memories using a write back attribute of the attribute register.

71. The method of claim 52, further comprising:

specifying one of a plurality of aging policies associated with the cache line entry using attributes of an aging policy field of the attribute register.

72. The method of claim 52, further comprising:

asserting a first attribute to specify a normal aging policy; and deasserting the first attribute to specify an invalidate-on-read policy.

73. The method of claim 72, further comprising:

asserting a second attribute to obviate invalidation of the cache line entry on a context switch; and deasserting the second attribute to invalidate the cache line entry on the context switch.

74. A network switch, comprising:

a processor;

a memory, the memory shared with the processor and a plurality of other devices within the switch;

a cache memory, the cache memory having at least one cache line entry for storing data prefetched from the memory by the processor;

means for referring to a specific line entry by a prefetch attribute register, the attribute register including a plurality of fields, the plurality of fields having attributes that specify a nature of data held in the cache line entry;

means for indicating by an attribute that a lock is associated with an entry; and means for identifying by a lock group field that the lock is to be released in response to a write memory access operation.

75. A network switch as in claim 74, further comprising:

means for providing by the cache memory a read buffer function, a write buffer function, and a buffering function for pending atomic commands.

76. A network switch as in claim 74, further comprising:

means for including in one of the plurality of fields a no write back field containing an attribute that allows conservation of an internal register of the processor in response to an index only signal issued by the processor to the cache memory during a read or write operation.

77. A network switch as in claim 74, further comprising:

means for indicating by an exclusive field of one of the plurality of fields whether data coherency synchronization is required.

78. A network switch as in claim 74, further comprising:

means for implementing data coherency synchronization by a locking semaphore, and an exclusive attribute specifies a prefetch memory access operation to the cache entry to thereby ensure an only valid copy of data at that location.

79. A network switch as in claim 74, further comprising:

means for managing an exclusive entry by a lock controller.

80. A network switch as in claim 74, further comprising:

means for specifying a length of data prefetched into the cache from the external memory by a length of data prefetched field, the length of data prefetched field being one of the plurality of fields.

81. A network switch as in claim 74, further comprising:

means for describing one of a plurality of aging policies associated with the cache line entry by an aging policy field, the aging policy field being one of the plurality of fields.

82. A network switch as in claim 74, further comprising:

means for indicating whether the cache line entry is cacheable by a cache attribute.

83. A network switch as in claim 74, further comprising:

means for indicating whether the cache line entry is maintained in the cache after a context switch by a keep attribute.

84. A network switch as in claim 74, further comprising:

means for having the cache memory as a fully associative cache.

85. A network switch as in claim 74, further comprising:

means for having the cache memory as a deferred store through level zero cache.

86. A network switch as in claim 74, further comprising:

means for indicating a write back policy by data held in the cache line entry.

87. A network switch as in claim 74, further comprising:

means for indicating a lockgroup by data held in the cache line entry.

88. A network switch as in claim 74, further comprising:

means for indicating a no write back by data held in the cache line entry.

89. A network switch as in claim 74, further comprising:

means for indicating an exclusive entry by data held in the cache entry.

90. A network switch as in claim 74, further comprising:

means for containing the prefetch attribute register within the processor.

91. A network switch as in claim 74, further comprising:

means for specifying a nature of a memory access to each cache line entry using attributes contained in fields of the attribute register.

92. A network switch as in claim 74, further comprising:

means for using the cache memory as a write buffer; and means for specifying a write back priority for transferring data stored in a L0cache to one of a plurality of external shared memories using a write back attribute of the attribute register.

93. A network switch as in claim 74, further comprising:

means for specifying one of a plurality of aging policies associated with the cache line entry using attributes of an aging policy field of the attribute register.

94. A network switch as in claim 74, further comprising:

means for asserting a first attribute to specify a normal aging policy; and means for deasserting the first attribute to specify an invalidate-on-read policy.

95. A network switch as in claim 94, further comprising:

means for asserting a second attribute to obviate invalidation of the cache line entry on a context switch; and means for deasserting the second attribute to invalidate the cache line entry on the context switch.

96. A method for operating an intermediate network station, comprising:

having in the intermediate network station a processor, a memory shared with the processor and a plurality of other devices within the switch, and a cache memory, the cache memory having at least one cache line entry for storing data prefetched from the memory by the processor;

controlling internal activities of the cache memory with a prefetch attribute register;

specifying a nature of a memory access to each cache line entry using attributes contained in fields of the attribute register;

specifying an aging policy associated with the cache line entry using attributes of an aging policy field of the attribute register;

asserting a first attribute to specify a selected aging policy; and deasserting the first attribute to specify an invalidate-on-read policy.

97. The method as in claim 96 further comprising:

having the attribute register in the processor.

98. An intermediate network station, comprising:

a processor;

a memory shared with the processor and a plurality of other devices within the switch;

a cache memory, the cache memory having at least one cache line entry for storing data prefetched from the memory by the processor;

means for controlling internal activities of the cache memory with a prefetch attribute register;

means for specifying a nature of a memory access to each cache line entry using attributes contained in fields of the attribute register;

means for specifying an aging policy associated with the cache line entry using attributes of an aging policy field of the attribute register;

means for asserting a first attribute to specify a selected aging policy; and means for deasserting the first attribute to specify an invalidate-on-read policy.

99. The intermediate network station of claim 98, further comprising:

means for having the attribute register in the processor.

100. An intermediate network station, comprising:

a processor;

a memory shared with the processor and a plurality of other devices within the switch;

a cache memory, the cache memory having at least one cache line entry for storing data prefetched from the memory by the processor;

a prefetch attribute register to control internal activities of the cache memory;

attributes contained in fields of the attribute register to specify a nature of a memory access to each cache line entry;

an aging policy field of the attribute register to specify an aging policy associated with the cache line entry;

a first attribute when asserted to specify a selected aging policy, and when deasserted to specify an invalidate-on-read policy.

101. The intermediate network station of claim 100, further comprising:

the attribute register is contained in the processor.

102. A computer readable media having instructions written thereon for execution on a processor for the practice of a method for prefetching data from one of an external and shared memory of a processing engine of an intermediate network station, the methods comprising the steps of:

Servicing the external and shared memories with a cache memory having a plurality of cache line entries for storing data transferred to and from the memories;

Controlling internal activities of the cache memory with a prefetch attribute register contained within a processor of the processing engine;

Specifying a nature of a memory access to each cache line entry using attributes contained in fields of the attribute register;

Specifying one of a plurality of aging policies associated with the cache line entry using attributes of an aging policy field of the attribute register;

Asserting a first attribute to specify a normal aging policy, such as a least recently used policy; and Deasserting the first attribute to specify an invalidate-on-read policy.

103. An electromagnetic signals propagating over a computer network, the electromagnetic signals carrying instructions for execution in a computer for the practice of a method for prefetching data from one of an external and shared memory of a processing engine of an intermediate network station, the methods comprising the steps of:

Servicing the external and shared memories with a cache memory having a plurality of cache line entries for storing data transferred to and from the memories;

Controlling internal activities of the cache memory with a prefetch attribute register contained within a processor of the processing engine;

Specifying a nature of a memory access to each cache line entry using attributes contained in fields of the attribute register;

Specifying one of a plurality of aging policies associated with the cache line entry using attributes of an aging policy field of the attribute register;

Asserting a first attribute to specify a normal aging policy, such as a least recently used policy; and Deasserting the first attribute to specify an invalidate-on-read policy.

104. A computer readable media having instructions written thereon for execution on a processor for the practice of a method of operating a network switch, comprising:

Having in the switch a processor, a memory, the memory is shared with the processor and a plurality of other devices within the switch, and a cache memory, the cache memory having at least one cache line entry for storing data prefetched from the memory by the processor;

Referring to a specific line entry by a prefetch attribute register, the attribute register including a plurality of fields, the plurality of fields having attributes that specify a nature of data held in the cache line entry;

Indicating by an attribute that a lock is associated with an entry; and

Identifying by a lock group field that the lock is to be released in response to a write memory access operation.

105. An electromagnetic signals propagating over a computer network, the electromagnetic signals carrying instructions for execution in a computer for the practice of a method of operating a network switch, comprising:

Having in the switch a processor, a memory, the memory is shared with the processor and a plurality of other devices within the switch, and a cache memory, the cache memory having at least one cache line entry for storing data prefetched from the memory by the processor;

Referring to a specific line entry by a prefetch attribute register, the attribute register including a plurality of fields, the plurality of fields having attributes that specify a nature of data held in the cache line entry;

Indicating by an attribute that a lock is associated with an entry; and

Identifying by a lock group field that the lock is to be released in response to a write memory access operation.

106. A computer readable media having instructions written thereon for execution on a processor for the practice of a method for operating an intermediate network station, comprising:

Having in the intermediate network station a processor, a memory shared with the processor and a plurality of other devices within the switch, and a cache memory, the cache memory having at least one cache line entry for storing data prefetched from the memory by the processor;

Controlling internal activities of the cache memory with a prefetch attribute register;

Specifying a nature of a memory access to each cache line entry using attributes contained in fields of the attribute register;

Specifying an aging policy associated with the cache line entry using attributes of an aging policy field of the attribute register;

Asserting a first attribute to specify a normal aging policy; and

Deasserting the first attribute to specify an invalidate-on-read policy.

107. An electromagnetic signals propagating over a computer network, the electromagnetic signals carrying instructions for execution in a computer for the practice of a method for operating an intermediate network station, comprising:

Having in the intermediate network station a processor, a memory shared with the processor and a plurality of other devices within the switch, and a cache memory, the cache memory having at least one cache line entry for storing data prefetched from the memory by the processor;

Controlling internal activities of the cache memory with a prefetch attribute register;

Specifying a nature of a memory access to each cache line entry using attributes contained in fields of the attribute register;

Specifying an aging policy associated with the cache line entry using attributes of an aging policy field of the attribute register;

Asserting a first attribute to specify a normal aging policy; and

Deasserting the first attribute to specify an invalidate-on-read policy.

* * * * *